Nov. 1, 1932.                H. O. WEBER                1,886,070

FINGER POSITION INDICATING MEANS FOR VIOLINS AND THE LIKE

Filed Nov. 9, 1931

INVENTOR
Herbert O. Weber
BY
ATTORNEYS

WITNESS

Patented Nov. 1, 1932

1,886,070

UNITED STATES PATENT OFFICE

HERBERT O. WEBER, OF PHILADELPHIA, PENNSYLVANIA

FINGER POSITION INDICATING MEANS FOR VIOLINS AND THE LIKE

Application filed November 9, 1931. Serial No. 573,844.

The present invention is in the nature of an attachment for stringed instruments of the violin group, and is particularly directed to providing means for assisting the instruction of pupils in the correct manner of playing an instrument of this class.

One of the greatest difficulties encountered by beginners in learning to play a violin arises through inability to accurately position the left or fretting hand with relation to the neck of the instrument so that the strings may be manipulated or fretted to produce correctly the musical notes desired, for at this stage of his education the pupil is unable to tell if a given note he is striking is a little sharp or a little flat and adjust the position of his left hand accordingly.

A principal object of this invention, therefore, is to provide a device which may be attached to a violin and permanently adjusted by the instructor so as to constrain the hand and fingers of the pupil to assume the proper position with relation to the neck of the instrument, whereby development of an habitually correct technique in this regard may be greatly facilitated.

A further object of my invention is to provide a device of this character which may be adjusted in accordance with the physical characteristics of any particular pupil and which, when so adjusted, is effective to properly determine the position of the left hand and fingers of such pupil with respect to the neck of the instrument.

A still further object of the invention is to provide such device which may be attached to a violin or like instrument and retained in position thereon throughout the instruction period until the pupil has attained sufficient competence to render its use superfluous and which is adapted to be secured to the head of the instrument and supported solely therefrom without the aid of clamps or other devices designed to engage the body of the instrument, the use of which tends to distort and injure the tone quality of the latter.

Other purposes, objects and advantages of the invention will hereinafter more fully appear or will be understood from the following description of one embodiment thereof in which reference will be had to the accompanying drawing.

Figure 1:
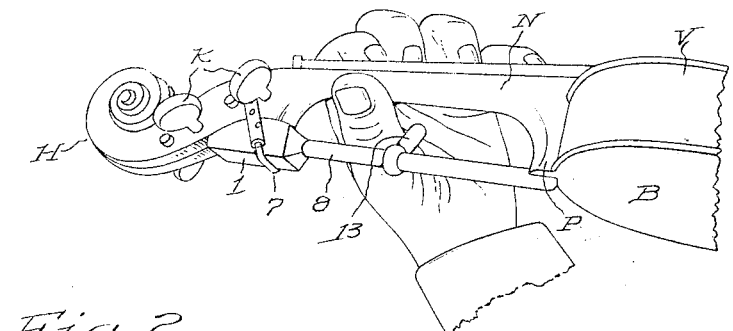
Figure 2:
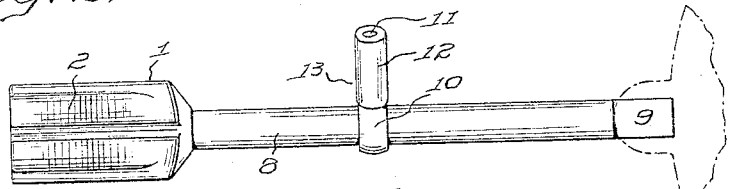
Figure 3:
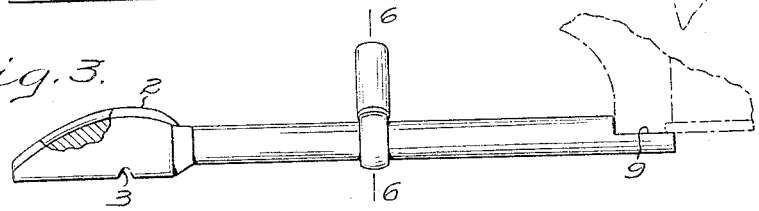
Figure 4:
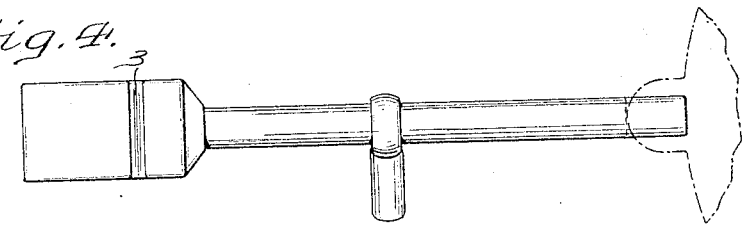
Figure 5:
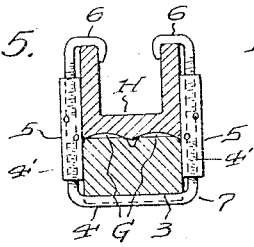
Figure 6:
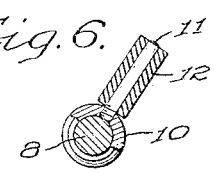

In the said drawing, Fig. 1 is a fragmentary perspective view of the device operatively attached to a violin, showing the hand of the player in playing position; Figs. 2, 3 and 4 are enlarged top, side and bottom views, respectively, of the device shown in Fig. 1 removed from the violin, a portion of the body and neck plate of the latter being indicated, however, in broken lines; Fig. 5 is a transverse section of the head of the violin with the device attached thereto, and Fig. 6 is a transverse section on the line 6—6 in Fig. 3. In the several figures, like characters are used to indicate the same parts.

Referring now more particularly to the drawing, it will be understood that the violin V shown in Fig. 1 may be considered as representing any violin of ordinary form and thus having a relatively narrow neck N terminating at its inner end in a neck plate P adjacent the body B of the instrument and at its outer end in a head H in which are arranged the keys K for tuning the several strings and maintaining tension thereon, the external contour of the head approximating a scroll with its under or back surface provided with a pair of transversely arcuate grooves G disposed side by side and extending longitudinally of the head.

The preferred embodiment of my invention, which is adapted for attachment to a violin of the character just described, comprises a supporting block 1 having its upper surface 2 shaped in all directions in substantial conformity with the contour of the grooved back surface of the head H adjacent the first two keys, that is, those most nearly adjacent the body B, so that the block will lie snugly thereagainst and, by engagement in the grooves G, tend to resist lateral twisting or turning with respect to the neck. In width, the block approximates that portion of the head against which it is designed to rest, and is preferably provided with a transverse groove 3 in its under face adapted to receive the central portion of a U-shaped strap 4 having threaded ends 4' received in internally threaded sleeves 5 into the opposite ends of which extend the threaded shanks of hooks 6 having oppositely inwardly turned ends adapted to embrace the upper opposite edges of the key box of the head, as best shown in Fig. 5, the U-shaped strap, sleeves and hooks thus forming a clamp generally designated as 7 by means of which the block can be detachably secured in position against the back surface of the head, the threads on the strap and on the shanks of the hooks being, of course, of opposite pitch so that by turning the sleeves after the parts are assembled in proper position, the block 1 can be drawn snugly against the back of the head.

Extending forwardly from the inner end of the block, which terminates approximately in the plane of the inner end of the head, is a rod 8 desirably of circular cross section; this rod may be either formed integrally with the block or separately therefrom and then inserted in a bore therein and permanently secured in place by glue or other suitable adhesive or, in fact, in any other convenient way, the rod 8 thus being adapted to extend substantially parallel with the neck of the violin and toward the body thereof when the block is assembled on the head. At its free end the rod is provided with a recess 9 adapted to receive the rear portion of the neck base, whereby the rod is steadied and longitudinal movement of the rod and block toward the body of the instrument prevented, but it will be understood that the length of the rod is preferably insufficient to permit it to contact any material portion of the instrument body proper so that the tonal qualities of the instrument are not affected in any way through the use of the invention.

The rod 8 serves as a support for a collar 10 which is slidably mounted thereon and provided with a radially directed threaded bore adapted to receive the correspondingly threaded end of a pin 11 which may desirably be surrounded by a rubber or other somewhat resilient sleeve 12, the pin and sleeve thus forming a guide post 13 adapted to be engaged by the thumb of the left hand of the player when the collar is secured at a suitable position of longitudinal adjustment upon the rod by screwing in the pin sufficiently to engage its end with the surface of the former.

Preferably, the block 1 and rod 8 are formed from wood of any suitable variety having sufficient strength for the purpose, while the members of the clamp 7, the collar 10 and pin 11 may be formed of brass or other suitable metal which may be plated with nickel or otherwise protected against corrosion if desired, and as the wooden parts, of course, may be stained and/or varnished, the device presents an attractive appearance, while its simple and compact nature, together with its light weight, permit it to be secured to the violin and left in place thereon for such time as it is needed without in any way detracting from the appearance thereof or interfering with the placing of the violin in a suitable case when not in use. It will be noted that the clamp 7 forms the sole attaching means for the block 1 and rod 8 when operatively positioned on the instrument, the shaping of the block in conformity with the adjacent portion of the head H cooperating with the pressure exerted through the medium of the clamp to securely hold the block, and in turn the rod, in correct position, the free end of the latter being to some extent steadied by engagement with the neck plate of the instrument as already explained. The presence of the device, therefore, in no way interferes with either the tonal quality or the playing of the instrument.

The adjustability of the guide post 13 longitudinally of the rod 8 enables it to be positioned by the instructor for the particular pupil using the violin in such manner that when the pupil brings his thumb to bear against the post as shown in Fig. 1, his fingers are automatically correctly positioned with relation to the violin neck when the instrument is being played, the post effectually preventing the pupil's hand from being inadvertently moved too close to the body of the instrument with resultant inaccuracies in the notes, although the freedom of the hand and wrist for normal playing movements is not restrained in any way.

It will, of course, be understood that when the proper positioning of the left or fretting hand has become habitual with the pupil, the use of position indicating means of any character becomes superfluous and the device of my invention may therefore at such time be readily removed from the instrument and either discarded or retained by the instructor for use by another pupil, since from its nature it is apparent that the wear to which it is subjected is substantially negligible.

While I have herein described a preferred embodiment of my invention with considerable particularity, it will be understood that changes and modifications in the form and arrangement of the several parts thereof either for the purposes described or to adapt it for use on other instruments of the same general character, such, for example, as the viola, violoncello, and the like, may be made if desired without departing from the spirit and scope of the invention as defined in the appended claims.

Having thus described my invention, I claim and desire to protect by Letters Patent of the United States:

1. Finger positioning means for attachment to a violin comprising a block having a portion formed to conform with a portion of the back surface of the violin head, clamping means comprising a U-shaped member and a pair of adjustable hooks operatively secured thereto embracing the block and adapted to maintain the block and head in mutual engagement, a rod carried by the block adapted to extend in substantial parallelism with the neck of the violin and to engage the neck base thereof and means adjustable longitudinally of the rod adapted to be engaged by the left thumb of the player when the violin is held in playing position.

2. A finger positioning attachment comprising a rod adapted to extend below the neck of a violin in substantial parallelism therewith and having a recess for receiving the neck base thereof, means adapted to seat against and conforming to the back surface of the head of the violin and supporting said rod, clamping means operable to maintain said first mentioned means in engagement with the head, a collar slidable on said rod and having a radial threaded bore, and a guide post threaded into said bore, projecting radially outwardly therefrom and operable to maintain said collar in adjusted position on said rod.

3. A finger positioning attachment comprising a rod adapted to extend below the neck of a violin in substantial parallelism therewith and into engagement with the neck base, means for operatively supporting the rod from the head of the violin and comprising a block conforming to the back surface of the violin head and a clamping means adapted for cooperation therewith, and a guide post carried by said rod, longitudinally and circumferentially adjustable thereon and projecting radially outwardly therefrom for engagement by the thumb of the violin player.

4. A finger positioning attachment comprising a block shaped into conformity with and adapted to be secured to the head of a musical instrument, means for removably securing the block to said head, a rod carried by the block adapted to extend into proximity with the neck base of the instrument when the block is in position on the head thereof, and a guide post supported on said rod and adapted to be secured thereto in predetermined position for contact by the left thumb of the player.

5. Finger position indicating means for attachment to a violin comprising a block having a portion conforming to the back portion of the violin head, a rod carried by the block and adapted to extend therefrom toward the body of the violin in substantial parallelism with the neck thereof when the block is secured to the head, means adjustable longitudinally of the rod adapted for engagement by the left thumb of the player when holding the violin in playing position, and a single means cooperative with the violin head and with the block for maintaining the latter and the rod in predetermined position with respect to the violin.

In witness whereof, I have hereunto set my hand this 6th day of November, 1931.

HERBERT O. WEBER.